(12) United States Patent
Pierce

(10) Patent No.: US 6,702,325 B1
(45) Date of Patent: Mar. 9, 2004

(54) MODULAR TRAILING ARM SUSPENSION

(75) Inventor: William C. Pierce, Muskegon, MI (US)

(73) Assignee: The Holland Group, Inc., Holland, MI (US)

( * ) Notice: Subject to any disclaimer, the term of this patent is extended or adjusted under 35 U.S.C. 154(b) by 35 days.

(21) Appl. No.: 10/048,291

(22) PCT Filed: Jul. 27, 2000

(86) PCT No.: PCT/US00/20442

§ 371 (c)(1),
(2), (4) Date: Jan. 24, 2002

(87) PCT Pub. No.: WO01/08909

PCT Pub. Date: Feb. 8, 2001

Related U.S. Application Data

(60) Provisional application No. 60/146,603, filed on Jul. 30, 1999.

(51) Int. Cl.[7] .................................................. B60G 9/02
(52) U.S. Cl. ................. 280/788; 280/124.116; 180/352
(58) Field of Search .................... 280/788, 124.116, 280/124.128, 124.156, 124.157; 180/349, 352, 378; 267/256

(56) References Cited

U.S. PATENT DOCUMENTS

| | | |
|---|---|---|
| 3,140,880 A | 7/1964 | Masser |
| 3,406,983 A | 10/1968 | Masser |
| 3,630,541 A | 12/1971 | Carlson et al. |
| 3,707,298 A | 12/1972 | Henry et al. |
| 4,114,923 A | 9/1978 | Raidel |
| 4,132,432 A | 1/1979 | Raidel |
| 4,309,045 A | 1/1982 | Raidel |
| 4,763,923 A | 8/1988 | Raidel |
| 4,802,690 A * | 2/1989 | Raidel ............... 280/124.157 |
| 4,858,949 A | 8/1989 | Wallace et al. |
| 5,083,812 A | 1/1992 | Wallace et al. |

* cited by examiner

Primary Examiner—Peter C. English
(74) Attorney, Agent, or Firm—Price, Heneveld, Cooper, DeWitt & Litton, LLP

(57) ABSTRACT

A modular suspension (10) adapted to mount on a vehicle frame having a pair of spaced C-shaped frame rails (12). The modular suspension comprises a pair of trailing arm assemblies (14) connected by a cross beam (50) and a trailing arm connection. Each of the trailing arm assemblies comprises a frame bracket (18) adapted to be mounted to one of the frame rails and a trailing arm (16) having one portion pivotally mounted to the frame bracket for pivotal movement about a pivot axis. The trailing arm connection (42, 52) extends between and is coupled to a portion of the trailing arms rearward of the pivot axis. The cross beam extends between and connects to the frame brackets such that a rail opening (56) having a shape for slidably receiving at least a portion of one of the frame rails is formed between each of the frame brackets and the cross beam. The modular suspension can be mounted to the frame rails by aligning each of the frame rails with each of the rail openings and moving the modular suspension longitudinally relative to the frame rails.

13 Claims, 2 Drawing Sheets

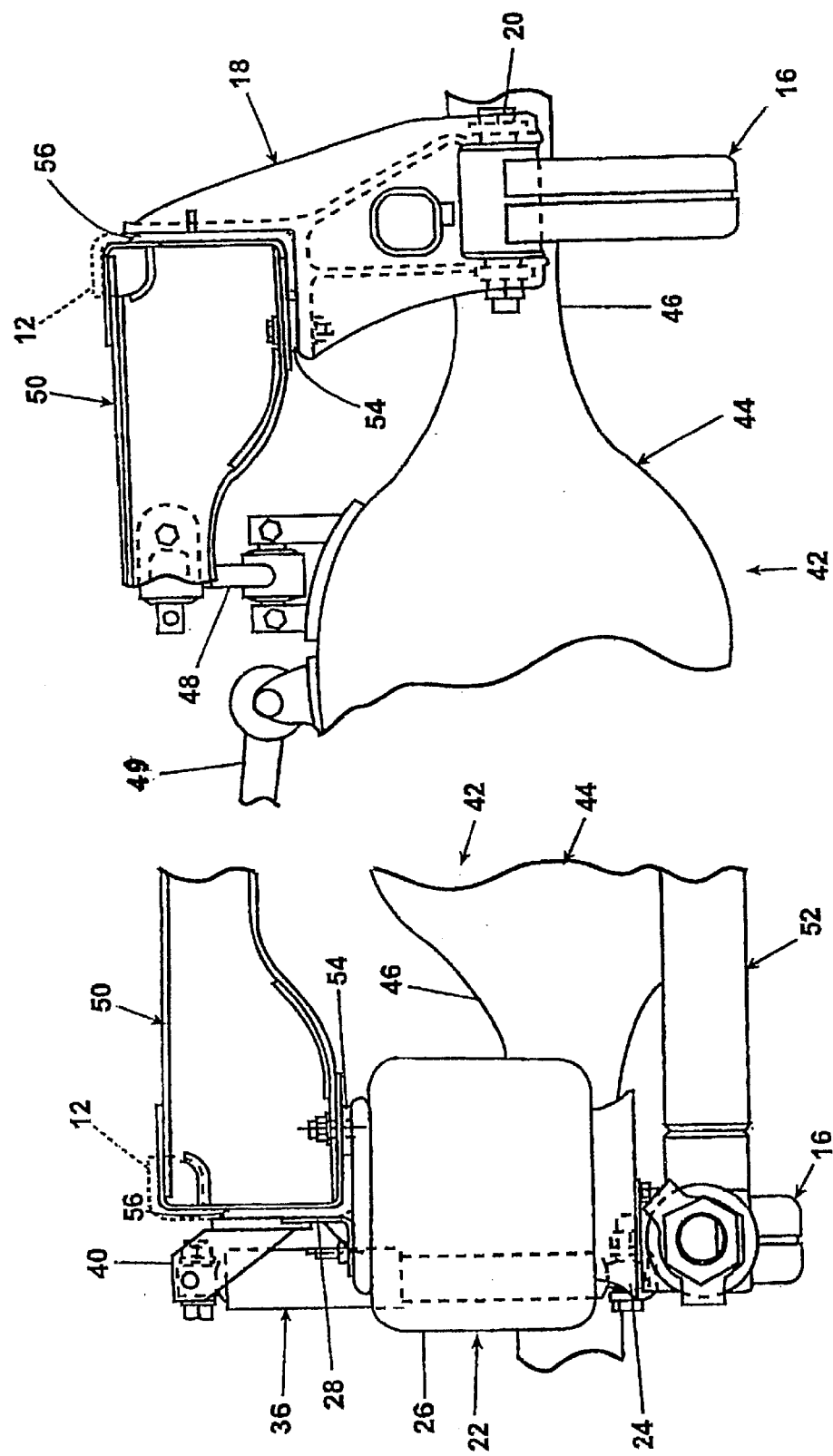

MODULAR TRAILING ARM SUSPENSION

RELATED APPLICATIONS

This application claims the benefit of International Patent Application No. PCT/US00/20442, filed Jul. 27, 2000, which claims the benefit of U.S. Provisional Patent Application No. 60/146,603 filed Jul. 30, 1999.

BACKGROUND OF THE INVENTION

1. Field of the Invention

The invention relates to a trailing arm suspension comprising a pair of trailing arm assemblies mounted to the frame rails of a vehicle and carrying an axle having ground engaging wheels. In one of its aspects, the invention relates to a trailing arm suspension module where the trailing arm assemblies are interconnected and prepositioned for installation so that the module can be directly installed to the vehicle as an integral unit.

2. Description of the Related Art

Heavy-duty vehicles such as semi-tractor/trailers typically have multiple trailing arm suspensions comprising a pair of trailing arm assemblies mounted to the vehicle or trailer frame and carrying an axle with ground engaging wheels. The axle can be either a drive axle or a non-drive axle. The trailing arm assemblies typically comprise a trailing arm having first and second ends. The first end is pivotally connected to a hanger bracket that is directly connected to the vehicle frame. The second end mounts one portion of an air spring having another portion mounted to the vehicle frame. The trailing arm is free to rotate about the pivotal connection with the hanger bracket and the air spring dampens the rotational movement of the trailing arm. The axle spans the opposing trailing arms and is secured to the trailing arms by suitable brackets. The trailing arm suspension can include other components such as shock absorbers and torsion rods, for example.

In all current trailing arm suspensions, the trailing arm assemblies and partial subassemblies of the other suspension components are built up on the vehicle. In other words, the trailing arm suspension is installed or mounted to the vehicle frame by sequentially mounting and interconnecting each of the components or partial subassemblies to each other on the vehicle frame as required. The build up approach to assembling and installing the trailing arm suspension requires a relatively long time and it is highly desirable to reduce the assembly time of the trailing arm suspension to reduce assembly costs.

SUMMARY OF THE INVENTION

The invention relates to a modular suspension adapted to mount on a vehicle frame having a pair of spaced C-shaped frame rails. The modular suspension comprises a pair of trailing arm assemblies connected by a cross beam and a trailing arm connection. Each of the trailing arm assemblies comprises a frame bracket adapted to be mounted to one of the frame rails and a trailing arm having one portion pivotally mounted to the frame bracket for pivotal movement about a pivot axis. The trailing arm connection extends between and is coupled to a portion of the trailing arms rearward of the pivot axis. The cross beam extends between and connects to the frame brackets such that a rail opening having a shape for slidably receiving at least a portion of one of the frame rails is formed between each of the frame brackets and the cross beam. The modular suspension can be mounted to the frame rails by aligning each of the frame rails with each of the rail openings and moving the modular suspension longitudinally relative to the frame rails.

The modular suspension further comprises a connector mounting each of the frame brackets to the cross beam. The connector can comprise a spacer mounted between a portion of the frame bracket and the crossbeam and a removable fastener secures the spacer to the frame bracket and cross beam.

The trailing arm connection can comprise an axle mounted to the trailing arms for movement therewith. The trailing arm connection can alternatively comprise a torque tube mounted to a portion of the trailing arms rearward of the pivot pin.

The frame rail opening is preferably L-shaped and slidably receives a portion of the frame rail.

The modular suspension can further comprise a spring adapted to operably connect the trailing arm to the vehicle frame for resisting the pivotal movement of the trailing arm about the pivotal axis toward the frame. A pair of shock absorbers can also be mounted to the modular assembly. Each of the shock absorbers has one end pivotally mounted to one of the trailing arms and the other end adapted to be mounted to one of the frame rails. A positioning bracket can extend between the other end of the shock absorber and the air spring to fix the position of the other end of the shock absorber in a position for mounting to the frame rail when the modular suspension is slidably mounted on the frame rails. A torsion torque rod extends from the axle to the cross beam and a lateral brace extends from the axle to one of the rails.

In another embodiment, the invention relates to a method for installing a modular suspension on a vehicle frame having a pair of spaced C-shaped frame rails. The modular suspension comprises a pair of trailing arm assemblies, each of which comprises a frame bracket and a trailing arm having one portion pivotally mounted to the frame bracket for pivotal movement about a pivot axis. A trailing arm connection extends between and is coupled to a portion of the trailing arms rearward of the pivot axis. A cross beam extends between and is connected to the frame brackets with a rail opening therebetween for slidably receiving at least a portion of one of the frame rails. The method comprises: aligning the frame rails with the rail openings, moving the modular suspension longitudinally relative to the frame rails to insert the rails into the rail openings, and affixing the cross beam and each of the frame brackets to the rails.

BRIEF DESCRIPTION OF THE DRAWINGS

In the drawings:

FIG. 2 is a partial rear view of the modular trailing arm suspension of FIG. 1; and FIG. 3 is a partial front view of the trailing arm suspension of FIG. 1.

DETAILED DESCRIPTION OF THE PREFERRED EMBODIMENTS

Figure 1:
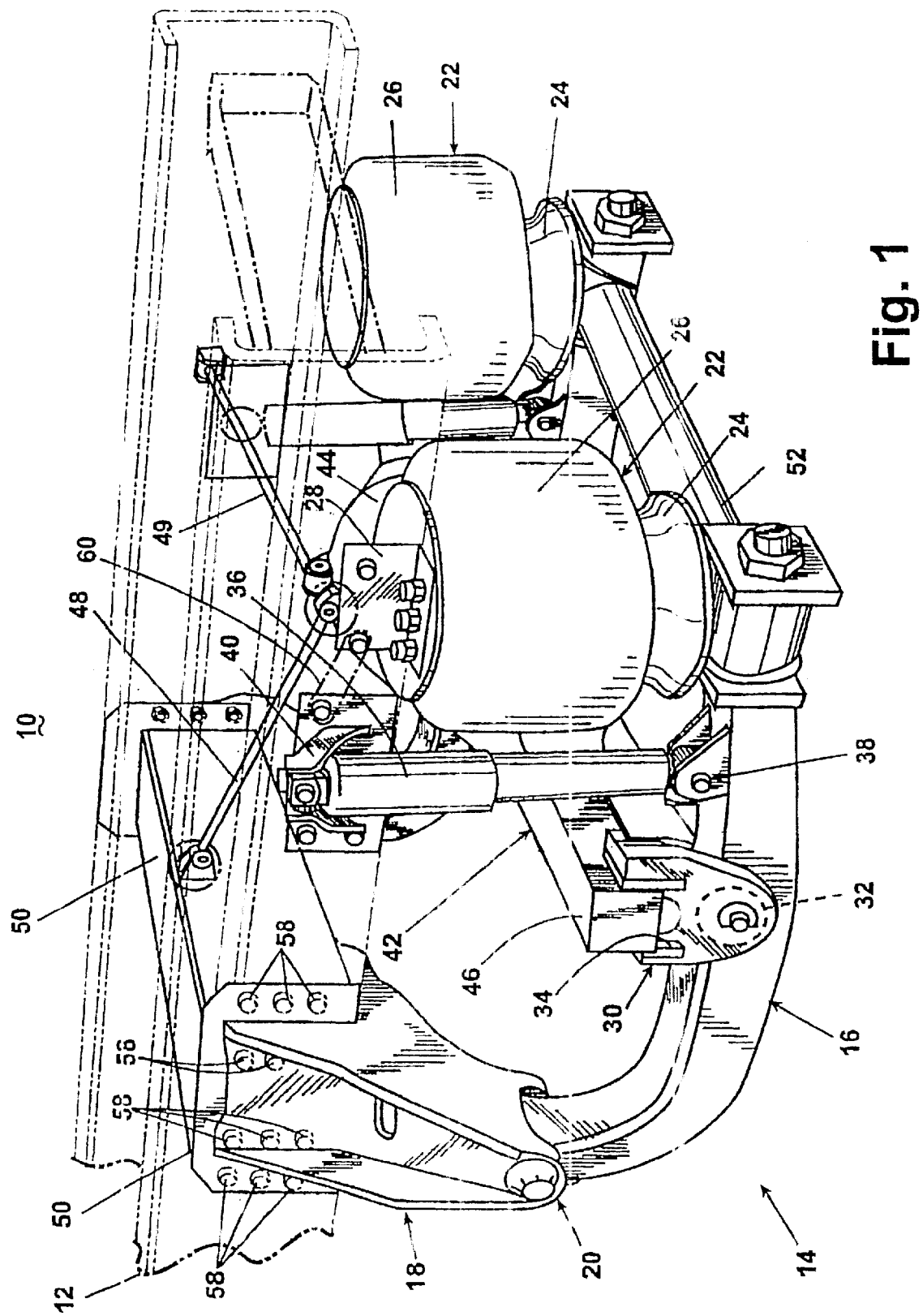
FIG. 1 is a perspective view of a modular trailing arm assembly according to the invention.

FIG. 1 illustrates a modular trailing arm suspension 10 according to the invention mounted to a pair of vehicle frame rails 12. The modular trailing arm suspension 10 comprises a pair of trailing arm assemblies 14, each of which is mounted to a corresponding frame rail 12. The trailing arm assemblies 14 are identical or mirror images and only one will be described in detail.

The trailing arm assembly 14 comprises a trailing arm 16 having a first end and a second end. The first end is pivotally mounted to a hanger bracket 18 by a bushed connection 20 such as an elastomeric bushing. The second end supports an air spring assembly 22, comprising a piston 24 fixedly mounted to the trailing arm second end and a flexible member 26 having a mounting plate 28 adapted to be secured to the vehicle frame rail 12.

An axle bracket 30 is pivotally mounted to the trailing arm 16 by a bushed connection 32. The axle bracket 30 includes an axle seat 34.

The trailing arm assembly 14 can include other components, such as a shock absorber 36, which has one end mounted to the trailing arm by a lower shock bracket 38 and whose upper end is adapted to be mounted to the vehicle frame rail 12 by an upper shock bracket 40.

In addition to the pair of trailing arm assemblies 14, the modular trailing arm suspension 10 comprises a drive axle assembly 42 comprising a differential housing 44 with axle housings 46. The axle housings 46 are received within the axle seat 34 so that the drive axle assembly 42 is carried by the trailing arm assemblies 14. A torque bar 48 has one end pivotally mounted to the differential housing 44.

The modular trailing arm suspension 10 also comprises a cross beam 50 extending between the hanger brackets 18 of the trailing arm assemblies 14 and a torsion tube 52 extending between the second ends of the trailing arms 16. A lateral rod or track bar 49 can be positioned between the differential housing 44 and the frame rail 12. A torque rod 48 extends from the axle differential housing 44 to the cross beam 50.

The aforementioned trailing arm suspension components are well known and currently used in trailing arm suspensions. The invention advantageously preassembles these components into a modular trailing arm suspension capable of being directly mounted to the frame rails 12 as a unitary whole. Referring to FIGS. 2–3, to form the module, the cross beam 50 is coupled to the hanger brackets 18 through a connector such as a filler plate 54, which is bolted between the cross beam 50 and the hanger brackets 18. The size and position of the filler plate 54 are selected to create an L-shaped gap 56 between the cross beam 50 and the hanger brackets 18. The L-shaped gap 56 conforms to a portion of the C-shaped cross-sectional shape of the vehicle frame rails 12 and permits the vehicle frame rails to be slidably inserted between the cross beam 50 and the hanger bracket 18, without the need for removing the filler plate 54. In this manner, the modular trailing arm suspension 10 can be slidably mounted onto the vehicle frame rails 12 by aligning the frame rails 12 with the L-shaped gap 56 and moving the modular suspension longitudinally relative to the frame rails. Alternatively, the frame rails can be moved relative to the modular suspension.

The cross beam forms one connection between the pair of trailing arm assemblies. The module is completed by forming a second connection between the trailing arm assemblies. The second connection can be formed by either the axle or the torque tube. The first and second connections between the trailing arm assemblies form a box-like module that is an independent, stand-alone structure. The spacing of the cross beam 50 with respect to the hanger brackets 18 pre-arranges the cross beam 50 and hanger brackets 18 for slidable mounting onto the vehicle frame rails 12. The combination of the axle 42 and the torsion tube 52 connecting the trailing arm assemblies further enhance the unitary structure.

Additionally, other components in the modular trailing arm suspension 10, such as the shock absorber 36, can be pre-positioned for direct mounting to the frame rail. A temporary bracket 60 (FIG. 1) may extend between the air spring mounting bracket 28 and the upper shock bracket 40 to fix the position of the shock 36 in its mounted position. Other components can also be prearranged on the modular trailing arm suspension 10.

To assemble the modular trailing arm suspension 10 to the vehicle frame rails 12, the modular trailing arm suspension 10 is slidably mounted onto the ends of the vehicle frame rails by inserting the vehicle frame rails 12 into the frame rail gaps 56 and sliding the modular trailing arm suspension 10 to the desired location where bolt openings in the various components align with corresponding bolt openings on the frame rails. Mounting bolts 58 are passed through the aligned bolt openings and partially secured. The filler plates 54 are removed and the mounting bolts are completely tightened. The suspension components, such as the shock absorber 36, are also bolted to the frame rail as is the air spring 22.

The benefit of the modular trailing arm suspension 10 is that the pre-mounting of the cross beam 50 to the trailing arm assemblies with the filler plate 54 permits the trailing arm assemblies 14 to be pre-assembled along with the torsion tube 52 and axle 42 into a module that is self supporting and capable of being directly mounted to the vehicle frame rails 12. The filler plate establishes the proper orientation between the cross beam 50 and the hanger brackets 18 to permit the insertion of the vehicle frame rails 12 therebetween, enabling the slidable mounting of the modular trailing arm assembly 10 to the vehicle frame rails.

The modular trailing arm suspension 10 greatly simplifies and speeds up the assembly of the trailing arm suspension to the vehicle frame rail. In previous trailing arm suspensions, it was necessary to build up the trailing arm suspension on the vehicle frame rails because the cross beam was mounted on an opposite side of the frame rails 12 than the hanger brackets, essentially prohibiting any easy pre-assembling of the cross beam and the hanger brackets. The invention greatly reduces the difficulty of installing the trailing arm suspension and permits the manufacturer of the trailing arm suspension to pre-assemble the trailing arm suspension into a module where it is shipped to the vehicle manufacturer for assembly as a module or subassembly in the overall vehicle assembly.

While the invention has been specifically described in connection with certain specific embodiments thereof, it is to be understood that the embodiments described are illustrative of the invention and not a limitation of the invention. Reasonable variation and modification are possible within the scope of the foregoing disclosure without departing from the spirit of the invention.

What is claimed is:

1. A modular suspension adapted to mount on a vehicle frame having a pair of spaced C-shaped frame rails, comprising:
    a pair of trailing arm assemblies, each trailing arm assembly comprising:
        a frame bracket adapted to be mounted to one of the frame rails; and
        a trailing arm pivotally mounted at one end to the frame bracket for pivotal movement about a pivot axis;
    a trailing arm connection extending between and coupled to the trailing arms rearwardly of the pivot axes; and
    a cross beam extending between the frame brackets and connected to the frame brackets with openings therebetween shaped with a profile of a size sufficient for slidably receiving at least a portion of the frame rails;

whereby the modular suspension is mounted to the associated frame rails by sliding the frame rails into and along the openings between the cross beam and the frame brackets.

2. The modular suspension according to claim 1, and further comprising a connector mounted each of the frame brackets to the cross beam.

3. The modular suspension according to claim 2 wherein the connector comprises a spacer mounted between a portion of each of the frame brackets and the cross beam.

4. The modular suspension according to claim 1 wherein the trailing arm connection comprises an axle mounted to the trailing arms for movement therewith.

5. The modular suspension according to claim 4 and further comprising an axle bracket resiliently mounted to each of the trailing arms and wherein the axle is mounted to the axle brackets.

6. The modular suspension according to claim 4, and further comprising a torque rod mounted at one end to the axle and mounted at the other end to the cross beam.

7. The modular suspension according to claim 4, and further comprising a lateral brace mounted to the axle at one end and adapted to be mounted to one of the frame rails at another end.

8. The modular suspension according to claim 1 wherein the trailing arm connection comprises a torque tube mounted to the trailing arms rearwardly of the pivot axes.

9. The modular suspension according to claim 1 wherein the openings between the cross beam and the frame brackets are L-shaped and slidably receive a portion of the frame rails.

10. The modular suspension according to claim 1 wherein each trailing arm assembly further comprises a spring mounted to the trailing arm at one end and adapted to be operably connected to the vehicle frame at another end for resisting the pivotal movement of the trailing arm about the pivot axis toward the frame.

11. The modular suspension according to claim 1 wherein each trailing arm assembly comprises a shock absorber having one end pivotally mounted to the trailing arm and the other end adapted to be mounted to one of the frame rails.

12. The modular suspension according to claim 11, wherein each trailing arm assembly further comprises a spring mounted to the trailing arm at one end and adapted to be operably connected to the vehicle frame at another end for resisting the pivotal movement of the trailing arm about the pivot axis toward the frame and further comprises a positioning bracket extending between the other end of the shock absorber and the spring to fix the position of the other end of the shock absorber in a position for mounting to one of the frame rails when the modular suspension is slidably mounted on the frame rails.

13. A method for installing a modular suspension on a vehicle frame having a pair of spaced C-shaped frame rails, the modular suspension comprising a pair of trailing arm assemblies, with each trailing arm assembly comprising a frame bracket and a trailing arm having one portion pivotally mounted to the frame bracket for pivotal movement about a pivot axis; a trailing arm connection extending between and coupled to a portion of the trailing arms rearward of the pivot axes; and a cross beam extending between and connected to the frame brackets with a rail opening between each of the frame brackets and the cross beam shaped for slidably receiving at least a portion of one of the frame rails; the method comprising:

aligning each of the frame rails with a corresponding one of the rail openings;

moving the modular suspension longitudinally relative to the frame rails to insert the frame rails into and along the rail openings; and affixing the cross beam and each of the frame brackets to the rails.

* * * * *